(No Model.)

A. J. BOLSTER.
DISK CULTIVATOR.

No. 489,845. Patented Jan. 10, 1893.

WITNESSES:
Chas. Nieder.
C. Sedgwick.

INVENTOR
A. J. Bolster
BY
Munn & Co
ATTORNEYS.

UNITED STATES PATENT OFFICE.

ALEXANDER J. BOLSTER, OF YORK, NEBRASKA.

DISK CULTIVATOR.

SPECIFICATION forming part of Letters Patent No. 489,845, dated January 10, 1893.

Application filed September 17, 1892. Serial No. 446,193. (No model.)

*To all whom it may concern:*

Be it known that I, ALEXANDER J. BOLSTER, of York, in the county of York and State of Nebraska, have invented a new and useful Improvement in Disk Cultivators, of which the following is a full, clear, and exact description.

My invention relates to an improvement in disk cultivators, and has for its object to provide a means whereby the disks may be run forward of the arch of the cultivator, thus bringing the draft near the team and locating the disks in a manner to be in full view of the driver of the machine at all times, the driver being thereby enabled to observe the action of the disks upon the ground, and if a hill should become covered up the driver will be enabled to stop and uncover it before passing on. The disks being located forward of the arch form a perfect balance under all conditions, as when the disks are raised out of the ground the weight of them will be forward of the arch and will prevent the pole or tongue from being lifted up.

The invention consists in the novel construction and combination of the several parts, as will be hereinafter fully set forth and pointed out in the claims.

Reference is to be had to the accompanying drawings forming a part of this specification, in which similar figures of reference indicate corresponding parts in both the views.

Figure 1:
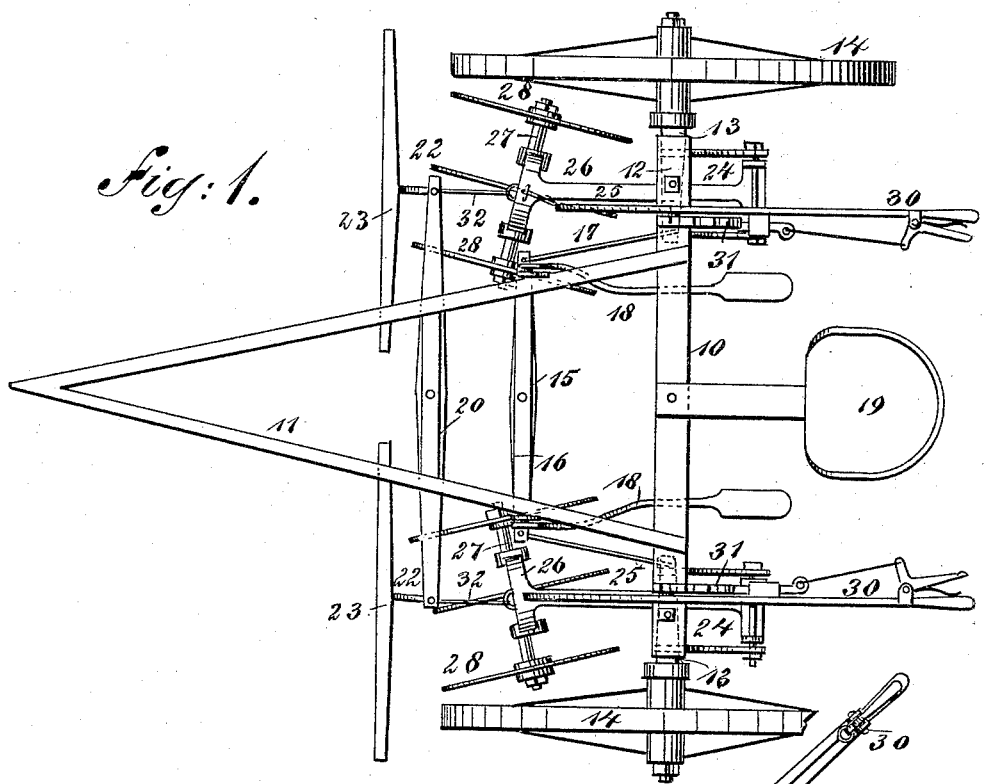
Figure 2:
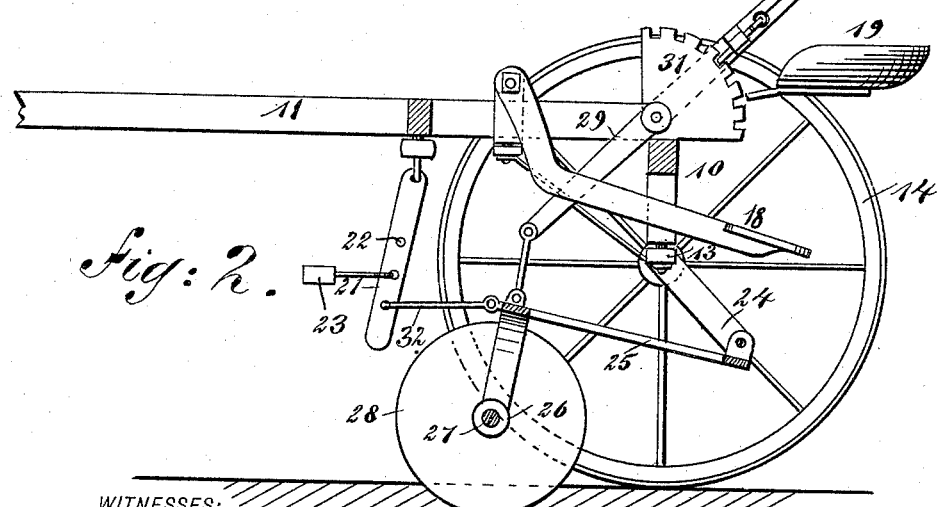

Figure 1 is a plan view of the machine; and Fig. 2 is a vertical longitudinal section through the same.

The frame of the cultivator is identical with that described and constituting the subject matter of the application for a patent filed by myself of even date herewith; therefore in this application the frame will be but briefly described. It consists of an arch 10, having attached thereto at its upper end a tongue or pole 11; and the arch at its lower end is provided with horizontally projected arms 12, and upon said arms spud axles 13, are pivoted, having loosely mounted supporting wheels 14. An evener 15, is fulcrumed upon a bar 16 attached to the pole, and this evener at its ends is connected by links 17, with the inner extremities of the spud axles. The evener at its extremities is acted upon by foot levers 18, fulcrumed upon the pole, which foot levers extend rearwardly to within easy reach of the driver's seat and have engagement with the ends of the evener. Either of the levers may be operated to throw the axles in direction of the right or of the left, according to the direction in which the implement is to be guided. The frame further consists in a second evener 20 fulcrumed to the pole in front of the evener 16. This evener 20, has pivotally attached to its ends downwardly extending bars 21, provided with a series of apertures 22, the bars near their lower ends being pivotally connected with singletrees 23. Each of the axles has attached to it a downwardly and rearwardly extending yoke 24, and each yoke has pivotally connected with it a shank 25, the shank being provided at its forward end with a downwardly extending sleeve 26; and in each of these sleeves a shaft 27, is journaled, the said shaft having secured thereon the disk cultivators 28. The shafts may be arranged straight, that is parallel with the arch, or as illustrated, they may be placed at an angle to it, in which latter event the shafts are inclined forwardly in the direction of the center of the machine. The shanks carrying the shafts are lifted upward or lowered through the medium of lift levers 29, one of which levers is connected with each shank. The levers are fulcrumed upon the arch 10, and carry hand latches 30, adapted to enter the teeth of the racks 31, as shown in Fig. 2.

It will be observed that the gangs of disks are arranged near to the supporting wheels, and that when the wheels are directed to the right or to the left, the gangs of disks follow in the same plane. It is also obvious that as heretofore stated not only the plants under cultivation, but the gangs of disks are in constant view of the driver, and that when the disks are raised their weight will be forward of the arch, and the tendency will be to draw or keep the pole downward. The disks are constantly held in the ground by means of links 32, connected with the draft bars 21 and with the shanks of the gangs of disks, said links being connected to the lower ends of the bars 21 as best shown in Fig. 2.

Having thus described my invention, I claim as new and desire to secure by Letters Patent,—

1. In a cultivator, the combination, with an arch, axles pivotally connected with the arch, and shifting mechanism supported by the arch, of shanks pivotally connected with the axles, gangs of disks carried by the shanks and located in advance of the axles adjacent to the supporting wheels, and a lifting device connected with each gang of disks, substantially as shown and described, whereby the disks may be raised and lowered and the axles may be carried either in the direction of the right or of the left, and the gangs of disks will move with the axles, maintaining their same relative positions to the supporting wheels.

2. In a cultivator, the combination, with an arch, spud axles pivotally connected with the ends of the arch, supporting wheels mounted upon the axles, an evener supported by the arch, foot levers acting independently upon the ends of the evener, and a link connection between the ends of the evener and the inner ends of the spud axles, of yokes projected downwardly and rearwardly from the axles, shanks pivotally connected with the yokes and extending forwardly beyond the arch, sockets carried by the shanks, shafts journaled in the sockets, disks mounted upon the shafts, a lifting mechanism connected with the shanks, a draft evener located in advance of the rear evener, and a connection between the draft bars and the shanks of the disk gangs, as and for the purpose set forth.

ALEXANDER J. BOLSTER.

Witnesses:
JAMES P. MILLER,
WILLIAM W. GLENDINNING.